US010759978B2

(12) United States Patent
Gray et al.

(10) Patent No.: US 10,759,978 B2
(45) Date of Patent: Sep. 1, 2020

(54) POLYOLEFIN-BASED HOT MELT ADHESIVES WITH IMPROVED PROCESSING AND BONDING PERFORMANCE

(71) Applicant: Bostik, Inc., Wauwatosa, WI (US)

(72) Inventors: Steven Daniel Gray, Mequon, WI (US); David Frederic Freund, Shorewood, WI (US); Richard Edward Hamann, New Berlin, WI (US); Miao Hu, Pewaukee, WI (US); Fabrice Nicolas-Henri Flores, Hondainville (FR)

(73) Assignee: BOSTIK, INC., Wauwatosa, WI (US)

( * ) Notice: Subject to any disclaimer, the term of this patent is extended or adjusted under 35 U.S.C. 154(b) by 0 days.

(21) Appl. No.: 14/882,242

(22) Filed: Oct. 13, 2015

(65) Prior Publication Data

US 2016/0102230 A1    Apr. 14, 2016

Related U.S. Application Data

(60) Provisional application No. 62/063,174, filed on Oct. 13, 2014.

(51) Int. Cl.
| C09J 123/12 | (2006.01) |
| C09J 123/14 | (2006.01) |
| C08L 23/12 | (2006.01) |
| C08L 23/14 | (2006.01) |
| C08K 5/521 | (2006.01) |
| C08K 5/01 | (2006.01) |

(52) U.S. Cl.
CPC ............ *C09J 123/12* (2013.01); *C08L 23/12* (2013.01); *C08L 23/14* (2013.01); *C08L 23/142* (2013.01); *C09J 123/14* (2013.01); *C09J 123/142* (2013.01); *C08K 5/01* (2013.01); *C08K 5/521* (2013.01); *C08L 2205/02* (2013.01)

(58) Field of Classification Search
CPC ....... C09J 123/14–16; C09J 123/10–24; C08L 23/10–142
See application file for complete search history.

(56) References Cited

U.S. PATENT DOCUMENTS

| 4,008,197 | A  | * | 2/1977 | Brauer ................. C08G 18/69 174/23 R |
| 5,948,720 | A  | * | 9/1999 | Sun ..................... C08F 10/00 502/104 |
| 6,797,774 | B2 |   | 9/2004 | Kijima |
| 7,262,251 | B2 | * | 8/2007 | Kanderski ............ C09J 123/142 524/13 |
| 7,776,242 | B2 |   | 8/2010 | Sato et al. |
| 8,476,359 | B2 | * | 7/2013 | Wang ................... C08F 214/18 524/515 |
| 2005/0159566 | A1 |   | 7/2005 | Minami et al. |
| 2006/0093764 | A1 |   | 5/2006 | Mehta et al. |
| 2007/0042193 | A1 | * | 2/2007 | Wang ..................... B32B 7/12 428/423.1 |
| 2010/0305259 | A1 |   | 12/2010 | Rodriguez |
| 2011/0021103 | A1 | * | 1/2011 | Alper ..................... B32B 5/26 442/329 |
| 2011/0172348 | A1 | * | 7/2011 | Hoya .................... C08L 23/142 524/528 |
| 2014/0147669 | A1 | * | 5/2014 | Thatcher .............. C09J 123/10 428/355 EN |
| 2014/0199545 | A1 |   | 7/2014 | Moriguchi et al. |
| 2014/0199907 | A1 |   | 7/2014 | Moriguchi et al. |
| 2014/0199908 | A1 |   | 7/2014 | Inoue |
| 2014/0350155 | A1 |   | 11/2014 | Hamann et al. |
| 2014/0358100 | A1 | * | 12/2014 | Remmers ............. A61F 13/539 604/365 |
| 2014/0371703 | A1 | * | 12/2014 | Davis ................... C09J 123/16 604/385.03 |
| 2015/0024649 | A1 |   | 1/2015 | Czaplewski et al. |
| 2015/0368522 | A1 | * | 12/2015 | Fujinami ............. C08F 110/06 156/327 |

FOREIGN PATENT DOCUMENTS

| WO | 2007022308 A1 | 2/2007 | |
| WO | 2007022372 A2 | 2/2007 | |
| WO | 2009032869 A1 | 3/2009 | |
| WO | WO 2010138253 A2 | 12/2010 | |
| WO | WO 2013039261 A1 * | 3/2013 | ............ C09J 123/12 |
| WO | WO-2014014491 A1 * | 1/2014 | ............ C08K 5/0016 |
| WO | WO 2014129301 A1 * | 8/2014 | ............ C08F 110/06 |
| WO | WO-2014190098 A1 * | 11/2014 | ............ C09J 157/02 |

OTHER PUBLICATIONS

REXtac automotive & transportation adhesives: Pure performance with REXtac APAO. Rextac LLC. http://www.rextac.com/pdf/rextac-automotive-transportationadhesives-v1-final.pdf. As viewed on Aug. 12, 2016.*
Vistamaxx 6202 Performance Polymer. Product Datasheet. ExxonMobil. Aug. 6, 2013.*
Polypropylene Random Copolymer Safety Data Sheet. Total Petrochemical. Feb. 17, 2016.*
L-MODU(Low Molecular weight and Low Modulus polypropylen). http://www.idemitsu.com/products/petrochemicals/chemicals/lmpo.html. As viewed on Apr. 13, 2017.*
Bremner, T. and Rudin, A. Melt flow index values and molecular weight distributions of commercial thermoplastics. Journal of Applied Polymer Science, 1990, 41, pp. 1617-1627. (Year: 1990).*

(Continued)

*Primary Examiner* — Stephen E Rieth
(74) *Attorney, Agent, or Firm* — Christopher Lewis

(57) ABSTRACT

A hot melt adhesive made from a blend of a polypropylene-based polymer, a polyolefin elastomer, and an amorphous polyolefin. These adhesives exhibit excellent molten and pre-set flow allowing them to wet out substrates yet develop properties needed to form and maintain strong bonds making them useful for hygiene, construction, and packaging applications.

31 Claims, No Drawings

(56) References Cited

OTHER PUBLICATIONS

Balani, K. et al. Biosurfaces: A materials science and engineering perspective. John Wiley & Sons, Inc. 2015. pp. 329-344. (Year: 2015).*
Peacock, A. J.; Calhoun, A. Polymer Chemistry: Properties and Applications. 2006. Cal Hanser Verlag. pp. 78-86. (Year: 2006).*
Sustic, A. A new family of higher performance rextac amorphous polyalphaolefins, APAOs. TAPPI Proceedings, 1997 Hot Melt Symposium. pp. 69-82. (Year: 1997).*
Chadwick, John C. Ziegler-Natta Catalysts. Encyclopedia of Polymer Science and Technology. John Wiley & Sons, Inc. 2003. (Year: 2003).*
The International Search Report dated Feb. 1, 2016 of the International Searching Authority in the corresponding PCT International Application No. PCT/US2015/055363.
The International Written Opinion dated Feb. 1, 2016 of the International Searching Authority in the corresponding PCT International Application No. PCT/US2015/055363.
PCT Search Report dated Jul. 30, 2014 for PCT International Application No. PCT/US2014/039041.
PCT Written Opinion dated Jul. 30, 2014 for PCT International Application No. PCT/US2014/039041.

* cited by examiner

POLYOLEFIN-BASED HOT MELT ADHESIVES WITH IMPROVED PROCESSING AND BONDING PERFORMANCE

BACKGROUND OF THE INVENTION

The present invention relates to hot melt adhesives, and more particularly to a hot melt adhesive made from a blend of a polypropylene-based polymer, a polyolefin elastomer, and an amorphous polyolefin. These adhesives exhibit excellent molten and pre-set flow allowing them to wet out substrates yet develop properties needed to form and maintain strong bonds making them useful for hygiene, construction, and packaging applications.

Hot melt adhesives are used to bond substrates using a wide range of application methods and process conditions for a large variety of end-uses. For example, hot melt adhesives are employed to bond non-woven materials, polymeric films, and elastomeric components in numerous fabricated articles. Laminate structures with hot melt adhesives serving to bind nonwoven materials and elastomeric components in a form of strands, films, or any other continuous or discrete form are especially useful in hygiene products like diapers.

Processing of hot melt adhesives is linked to their ability to be melted, transported and/or coated in a molten stage at the final location where the bond is required. Molten adhesives can be sprayed or coated as thin layers. Once cooled, the adhesive needs to fulfill multiple requirements such as suitable bond strength measured by peel force or bond retention during or after mechanical stress, and during or after various thermal conditions.

Hot melt adhesives can be based on polymers such as polyolefins (ethylene- or propylene-based polymers), or functionalized polyolefins (ethylene or propene copolymers with oxygen containing monomers), or styrenic block copolymers containing at least one rubbery phase, like styrene-isoprene-styrene (SIS), or styrene-butadiene-styrene (SBS) polymers. Styrenic block copolymers are commonly employed due to their dual characteristics, i.e. cohesion of the styrenic phase associated with the rubbery behavior of the poly(butadiene) or poly(isoprene) phase.

Over the years, many different olefinic polymers have been used in the formulation of hot melt adhesives. The first of these were amorphous polypropylenes (APP) that are characterized by having a random steric orientation of the pendant methyl group along the carbon chain. The lack of stereoregularity frustrates APP systems from crystallizing making them soluble materials that could be combined with various tackifiers, plasticizers, waxes and fillers to produce a hot melt adhesive for a variety of end-use applications.

Later, olefin polymers became available that had much improved properties over the original amorphous polypropylene polymers. These are referred to as amorphous poly alpha olefins (APAO). They are generally produced using Ziegler-Natta catalysis and can be made using a variety of monomers, including but not limited to propylene, ethylene and butene. Various copolymers and terpolymers are produced by a number of manufacturers. They include Evonik Industries, who produce the Vestoplast® polymers; REXtac, LLC, who produces the Rextac® range of materials, and Eastman Chemical, manufacturers of the Eastoflex® line of polymers. They are all characterized by having a very low degree of crystallinity as measured by DSC. As commercially produced, they are random polymers having broad molecular weight distributions.

More recently, metallocene and single-site catalysis have been developed to produce polyolefins with more precisely tailored properties. For example, the molecular weight distribution can be controlled to provide polymers with significantly narrower polydispersity values compared to those produced employing traditional Ziegler-Natta catalysts. Metallocene and single-site catalysts also can be designed that display high comonomer incorporation rates compared to Ziegler-Natta catalysts. This allows high levels of comonomers, such as 1-butene and 1-octene, to be incorporated into ethylene-based copolymers and provide low density polyethylene copolymers. Examples of ethylene-based copolymers of this class include Affinity® and Engage® polymers from the Dow Chemical Company. Similarly, metallocene and single-site catalysts have been developed which allow propylene-based copolymers to be produced that contain high levels of ethylene and/or other alpha-olefins. Examples of propylene-based copolymer systems include Vistamaxx® polymers from ExxonMobil and Versify® grades available from the Dow Chemical Company. Metallocene and single-site catalysts also can also be exploited to control the chain architecture of polyolefins and their copolymers. These catalysts govern the degree of stereo- and regio-defects along the polymer chains and, in turn, the crystallinity and final properties. Control of polymer stereo-regularity using these catalysts can be performed such that pendant substituents of neighboring backbone carbons ("diads") are primarily arrayed in an identical ("meso") fashion to provide highly isotactic polymers. Conversely, metallocene and single-site catalysts can be designed such that side-branch alkyl groups are oriented in an opposing fashion to afford syndiotactic polymers. Recently, catalysts have been developed that target a fixed level of stereo-defects to allow for fine control of polymer properties. For example, a highly isotactic polypropylene homopolymers with very low levels of stereo-errors (racemic content less than 0.50 mol %) are generally stiff, high melting materials. Conversely, using catalysts designed to selectively introduce a controlled level of racemic errors can provide materials that, while chemically identical, display enhanced flexibility and are much lower melting. Examples of this class of polymers include L-MODU S400, S600, and S901 propylene-based polymers available from Idemitsu Chemicals. While these polymers have been used to make hot melt adhesives with better adhesion characteristics, they have not been widely used in applications requiring high flow, excellent wet out, and strong initial bonding that is maintained with long-term aging.

SUMMARY OF THE INVENTION

The present invention is an adhesive based on mixtures of a polypropylene copolymers, polyolefin elastomers, and amorphous polyolefins. These adhesives exhibit excellent initial and pre-set flow allowing them to evenly coat ("wet out") substrates yet form strong initial bonds that are maintained upon long-term aging making them useful for hygiene, construction, and packaging applications.

Hot melt adhesives that employ APP, APAO, and low density metallocene and/or single-site polyolefin elastomers are well known in the art. Due to their low crystallinity, adhesives made from these polyolefin systems generally show good compatibility and long-term thermal aging performance with plasticizing and tackifying agents commonly used in hot melt formulations. Due to their low crystallinity, however, these polyolefin species tend to develop properties only slowly after application, leading to long open times that can make them unsuitable for construction applications where the adhesive properties must develop rapidly to form strong bonds. Slow set up characterized by the slow development of properties such as stiffness upon cooling can allow the adhesive to over-penetrate and/or be readily forced through porous substrates upon compression as layers of the laminate structure are brought together. Over-penetration and/or retarded property development can, in turn, lead to the adhesive fouling on nip rollers and idlers of coating equipment. This can also lead to blocking issues and, in severe cases, even compromise the mechanical performance of the final laminated article. Additionally adhesives based on low modulus polyolefins often continue to flow even after they have cooled to room temperature; while this eventually ceases with the development of crystallinity, controlling this temporary "cold flow" is critical to the material displaying proper performance. Such behavior can be exploited to provide high flow adhesives that uniformly wet-out and penetrate substrates and give strong initial bonds; nevertheless, this "cold flow" must be mitigated to prevent the deleterious effects of substrate over-penetration described above. Finally, adhesives generated solely from polyolefins with limited crystallinity can also display poor long-term performance when used in applications where the adhesive must be able to resist shear forces. Adhesives based solely on low-crystallinity polyolefin elastomers or APAO generally offer little resistance to such failure modes.

Hot melt adhesives based on higher crystallinity polyolefins can offer a different set of potential drawbacks. Polyolefin polymers containing low levels of comonomer can be employed to provide hot melt adhesive formulations that develop properties rapidly upon cooling in coating applications. These more crystalline materials, however, tend to exhibit poor long-term compatibility in hot melt adhesive formulations. Additionally, hot melt adhesives generated from high crystallinity polyolefins tend to possess lower tack due to the higher modulus when the polymer is added at levels required to provide suitable cohesive strength needed to form strong bonds.

Combinations of polyolefin elastomers with polypropylene polymers and copolymers have been reported that help to overcome some of the issues described formulating from the independent components. Given their semicrystalline nature, however, mixed polyolefins systems can show lower than required set up times for end-use applications. For this reason, higher crystallinity materials such as waxes are often added to polyolefin-based hot melt adhesives to assist the rapid development of properties after application. Despite the benefits offered, systems employing low molecular weight, crystalline waxes have significant limitations. In general, crystalline waxes exhibit limited compatibility with hot melt adhesive formulation components leading to phase separation and poor long-term thermal stability. Additionally, the use of low molecular weight, crystalline waxes at even relatively low levels can compromise the mechanical properties such as elongation required for hot melt adhesives employed in elastomeric constructions. Therefore, there exists a need in the art for hot melt adhesive formulations that display excellent flow properties during and shortly after application to form strong bonds initially that are maintained after long-term aging as well as possess mechanical properties suitable for the targeted end-use application.

Quite surprisingly, we have found that the careful combination of propylene-based polymers, elastomeric polyolefins, and amorphous polyolefins yields hot-melt formulations that have suitable physical properties for a variety of end-use applications and display excellent flow during and shortly after initial application leading to strong initial bonding that is maintained upon aging.

The polypropylene copolymers or heterophasic systems commonly referred to as random copolymers are employed in the invention to control the set up of the hot-melt formulation. Their inclusion allows the degree of initial flow seen after application to be controlled to prevent over-penetration, and in turn, bleed through and blocking that is seen in when using only polyolefin elastomers or APAO or their combinations. Polypropylene copolymers suitable for this invention include polypropylene-co-olefin) copolymers and terpolymers with relatively high crystallinity that display melting points in the range of 130 to 165° C. Polypropylene impact copolymers can also be employed. Unlike APP materials, higher density polypropylene polymers and copolymers described above generally lack adhesion, open time and processability needed for adhesive hot melt applications. With careful formulation, however, these materials can be designed to achieve the desired adhesive properties. The level of propylene copolymer or impact copolymer is typically set based on the degree of flow and set up needed for appropriate substrate penetration, initial bonding, and long-term aging performance. Examples of types of polypropylene grades acceptable for this invention are Pro-fax random copolymers offered by LyondellBasell as well as those offered by Braskem. Examples of polypropylene impact copolymers include the various polymer grade slates such as Hostalen®, Moplen®, and Pro-fax®, as well as several other brands available from LyondellBasell and TOTAL Petrochemcials. Polypropylene impact copolymers are also routinely produced by any of a host of companies that participate in today's injection molding polypropylene polymer marketplace are also suitable for this application.

Relatively low molecular weight, low-modulus olefin polymers commonly referred to as polyolefin elastomers are present in the formulation to provide cohesive strength, elasticity, as well as to mitigate the flow and wet out of the adhesive immediately after application. Though properties are believed to develop only gradually after application, the ultimate crystallinity offered by these polymers appears critical to bond stability over long-term aging. Polyolefin elastomers suitable for the present invention include low tacticity propylene homopolymers with meso diad concentrations less than 90 mol % and melting points below 130° C. The most preferred propylene homopolymers can be obtained from by Idemitsu Kosan Co., Ltd. under the trade name L-MODU. Particularly suitable are L-MODU S400, S600, and S901 grades. Other polyolefin elastomers suitable for the present invention can be formed from random poly-α-olefin copolymers and terpolymers derived from ethylene, propylene, butene, hexene, octene and combinations thereof. Polyolefins include ethylene polymers, propylene polymers, and combinations thereof including combinations with other $C_4$-$C_{10}$ alpha-olefins. Elastomeric polyolefins typically contain ethylene and propylene, and may contain other $C_4$-$C_{10}$ olefin monomer units. Some particularly preferred polyolefin polymers are copolymers of propylene with at least one other olefin monomer, such as ethylene-propylene copolymers and ethylene-octene copolymers. By varying the level of low modulus polyolefin, the flow and overall physical properties of the hot-melt formulation can be tailored to meet the application and performance requirements of the adhesive in the laminated structure.

An APAO is required in present invention to provide cohesive strength, elasticity as well as mitigate the flow of the molten adhesive directly after application. The benefits offered by the APAO are similar to those provided by the low modulus polyolefin systems described above. Due to their amorphous nature, however, APAO materials appear to display enhanced compatibility with other key components of the inventive formulations to provide enhanced long term phase stability relative to the semicrystalline materials also included in the invention. The APAO component of the blend useful in the present invention consists of several different categories of atactic, low molecular weight, low melt viscosity, and substantially amorphous propylene-containing polymers. The term "substantially amorphous" is defined herein as having a degree of crystallinity less than 30%, as determined by differential scanning calorimetry (DSC) against a highly crystalline polypropylene standard. These polymers can be either homopolymers of propylene or copolymers of propylene with one or more α-olefin comonomer, such as, for example, ethylene, butene-1, hexene-1 and octene-1. Poly(l-butene-co-propylene) polymers referred to as "butene rich" APAO polymers are also suitable for the present invention. The average weight molecular weight of the APAO polymers in the scope of the present invention is in the range of from about 4,000 to about 150,000 g/mol, preferably from about 10,000 to about 100,000 g/mol. The said polymers have advantageously a softening point between about 80 and 170° C. and a glass transition temperature from about −5 to −40° C. The amorphous homopolymers and copolymers are polymers produced by Ziegler-Natta catalysts. With Ziegler-Natta catalysts, the produced amorphous polymers have wider molecular weight ranges and composition distributions. The amorphous polymers produced with Ziegler-Natta catalysts are non-stereospecific, e.g., atactic in its morphology. The molecular weight distribution of the amorphous polymer is generally greater than 2 and preferably in the range of 3 to 12.

In one embodiment, the amorphous polymers are poly-α-olefin polymers that have a melt viscosity range greater than about 500 cP to about 50,000 cP and more preferably 500 cP to 20,000 cP at 190° C. (as determined in accordance with ASTM D3236).

Although any APAO polymer falling in the range of physical properties herein described above can be used, preferred APAO polymers are selected from the group consisting of propylene homopolymer, propylene-ethylene copolymer, propylene-1-butene copolymer and terpolymers of propylene, ethylene, and 1-butene. The most preferred amorphous poly-α-olefins are "butene rich" poly(l-butene-co-propylene) copolymer and/or amorphous polypropylene co- and terpolymers of ethylene and/or 1-butene. Exemplary amorphous poly-α-olefin copolymers include the REXtac® 2830 from Rexene and Vestoplast® 508 from series from Evonik Industries.

Various methods are conventionally used to coat a hot melt adhesive at fairly low viscosity onto a substrate. This can be accomplished by roll coating or any printing type method, or by slot coating, by extrusion or by spray gun. Spray gun techniques are numerous and can be done with or without assistance of compressed air that would shape the adhesive spray, and consequently the adhesive pattern. The hot melt adhesive material is generally allowed to melt in tanks, and is then pumped through hoses to the final coating spot on the substrates. Any application temperature above the softening point of the adhesive formulation is suitable, although for the preferred invention, the temperature at which the hot melt adhesive is applied should be equal to or below 190° C., preferably equal to or below 180° C., and most preferably equal to or below 170° C., so that heat sensitive substrates would not be damaged.

The viscosity (as measured via ASTM D3236-88) of the adhesive material should be generally equal to or lower than 40,000 cP, preferably equal to or lower than 30,000 cP, more preferably equal to or lower than 20,000 cP, and most preferably lower than 10,000 cP measured at 163° C. (325° F.). An adhesive with such low viscosity is needed to be processed through standard hot melt adhesive equipment and to achieve the right pattern and consequently the right bonding performance at the application temperature.

The adhesive of the present invention can be used with any application where various substrate materials are involved. Examples include non-woven materials, polymeric films, and, in general, elastomeric components put in items such as diapers, in the form of strands, films, nonwovens or any other continuous or discrete form. Any substrate material and any substrate form could be used in any combination possible with the adhesive serving to bond two or more substrates together. The substrates can be of multiple forms for example fiber, film, thread, strip, ribbon, coating, foil, sheet, and band. The substrate can be of any known composition for example polyolefin, polyacrylic, polyester, polyvinyl chloride, polystyrene, cellulosic like wood, cardboard and paper, or made out of mineral compounds like concrete, glass or ceramics. The substrate's mechanical behavior can be rigid, plastic or elastomeric. Among elastomeric material are various examples like natural or synthetic rubber, polyurethane based copolymers, polyether or polyester urethanes, block copolymers of styrene or of amides, or olefinic copolymers. The above lists are not limitative or all-inclusive, but are only provided as common examples. In the present invention, various methods to process hot melt adhesives can be employed, based on their ability to be melted, and transported and/or coated or sprayed in a molten stage to the final location where the bond is required.

The adhesive of the present invention can also be used with any application where composites and disposable products are made with the help of bonding parts together while obtaining adequate cohesion from the adhesive bond to withstand mechanical stress at low, ambient or elevated temperature, in particular under shear conditions. Diaper, adult incontinence products, sanitary napkins and other absorbent disposable products are envisioned applications for the adhesive composition of the invention, as well as bed pads, absorbing pads, surgical drapes and other related medical or surgical devices. Construction applications, structural applications or packaging applications, in particular disposable items are envisioned for food or general packaging, labeling of packages, cans, or bottles, various product assembly, as well as transportation related bonding applications are also examples of where the invention is useful. The adhesives are also useful in the construction of poly and poly woven bags or articles.

Preferred Embodiment

Accordingly, the present invention provides a hot melt adhesive composition, comprising a blend of the following components:

About 1% to about 30%, preferably about 2% to about 20%, more preferably about 2.5% to about 15%, and most preferably about 8% to about 12%, by weight, of a polypropylene random copolymer or a polypropylene impact copolymer, or a mixture of polypropylene random copolymers, or a mixture of polypropylene impact copolymers, or a mixture of one or more polypropylene random copolymers with one or more polypropylene impact copolymers; the preferred copolymer being a polypropylene random copolymer;

About 2% to about 60%, preferably about 5% to about 50%, more preferably about 10% to about 40%, and most preferably about 22% to about 28%, by weight, of olefin based elastomer or mixture of olefin based elastomers; the preferred olefin based elastomer being a low melting point polypropylene homopolymer;

About 1% to 30%, preferably about 2% to about 20%, more preferably about 2.5% to about 20%, and most preferably about 10% to about 15%, by weight, of an amorphous polyolefin, or a mixture of amorphous polyolefins; the preferred amorphous polyolefin being a butane rich amorphous polyalpha olefin (APAO);

About 5% to about 70%, preferably about 10% to about 60%, more preferably about 20% to about 55%, and most preferably about 21% to about 27%, by weight, of a tackifying resin having a softening point of at least about 80° C. and up to about 140° C., and preferably a softening point of from about 85° C. to about 135° C., or a mixture of tackifying resins; the preferred tackifying resin being a hydrocarbon tackifying resin;

0% to about 60%, preferably about 1% to about 60%, more preferably about 5% to about 50%, even more preferably about 20% to about 50%, and most preferably about 24% to about 29%, by weight, of a plasticizer, or a mixture of plasticizers; the preferred plasticizer being a mineral oil;

0% to about 5% by weight, preferably about 0.1% to about 5%, of a stabilizer or antioxidant, or a mixture of stabilizers or antioxidants; and wherein the components total 100% by weight of the composition, and the viscosity (measured by ASTM D3236-88) of the composition is equal to or less than about 40,000 cP at 163° C. (325° F.), preferably equal to or less than 30,000 cP at 163° C., more preferably equal to or less than 20,000 cP at 163° C., and most preferably equal to or less than 10,000 mPas at 163° C.

In addition to the polymer components in the present adhesive composition about 1% to about 15% by weight of an additional auxiliary polymer comprising ethylene vinyl acetate, polyethylene, low density polyethylene, linear low density polyethylene, polybutene-1, polybutene-1/ethylene polymers or a styrenic block copolymer such as styrene-isoprene-styrene block copolymer, styrene-butadiene-styrene block copolymer, styrene-isoprene or styrene-butadiene diblock polymers, styrene-(isoprene/butadiene)-styrene block copolymers, styrene-(ethylene/butylene)-styrene block copolymers, styrene-(ethylene/propylene) diblock copolymers, styrene-(ethylene/propylene)-styrene block copolymers, styrene-(ethylene-ethylene/propylene)-styrene block copolymer and blends of each thereof, may also be used. The auxiliary polymer is a polymer that is different from the polypropylene copolymers and impact copolymers, the olefin based elastomer, the APAO, and the tackifying resins, and functions to provide a desired physical property, depending on the end use of the adhesive composition.

Relatively low amounts, 0.1 to about 5% by weight, of paraffin waxes, microcrystalline waxes, polyethylene waxes or polypropylene waxes and the like may also be used to adjust surface tack so long as the wax does not interfere with the level of performance required by the end use.

Polyolefin nucleating agents may also be present in the invention. Nucleating agents suitable for this invention are generally of the sub class of nucleating agents known as clarifying agents that are commonly employed in polyolefins additive packages to promote rapid crystallization. Suitable materials include dibenzylidene sorbitol derivatives such as Millad 3988 and Millad NX8000 supplied by Milliken as well as Irgaclear D produced by BASF. Other suitable agents include aromatic amide systems such as NJ Star NU-100 provided by New Japan Chemical Company.

The nucleating agent is generally present in the adhesive compositions in amounts of about 0.05 to 5.0% by weight of the composition, preferably about 0.1 to 2.5% by weight are utilized, and most preferably about 0.2 to 1.0% by weight. Blends of two or more nucleating agent may also be used. For example, a blend of a nucleating agent and a second nucleating agent that is different than the first nucleating agent may also be employed. From about 0.05% to about 5.0% by weight of one or more additional nucleating agent may be blended together with the first nucleating agent if desired. The nucleating agent may be used directly as a powder, or as a slurry in a portion of suitable plasticizing agent, or as a component in a master batch of a suitable polymer such as Milliken NX-10.

The adhesive composition and/or laminate of the present invention may be used in making a variety of end products. Examples include a disposable diaper, a sanitary napkin, a bed pad, a bandage, a surgical drape, a tape, a label, a plastic sheet, a nonwoven sheet, a paper sheet, a cardboard, a book, a filter, or a package.

In yet another aspect, the present invention provides a method of making a laminate comprising the steps of feeding a first substrate in a first direction; feeding a second substrate spaced from said first substrate in said first direction; applying the adhesive composition to one or both of said substrates; and compressing said substrates together to form the laminate.

When an elastomeric laminate is desired, the method includes the additional steps of feeding one or a plurality of elastomeric substrate or substrates between said first and second substrates in said first direction, said elastomeric substrates are stretched before, during or after adhesive application; and applying the adhesive composition to either said elastomeric substrate or substrates or one or both of said substrates before compressing the substrates together. The elastomeric substrate is preferably at least one elastic strand stretched up to 500% from its initial relaxed state.

DETAILED DESCRIPTION OF THE INVENTION

The invention consists of formulations containing at least one of each of the following components: (1) a polypropylene random copolymer or impact copolymer; (2) a polyolefin elastomer; (3) an amorphous polyolefin (APAO); and (4) a tackifying agent; and optionally, (5) a plasticizer; (6) a stabilizer or antioxidant; and (7) additives, waxes, surfactants, fillers, nucleation packages, and/or other auxiliary components as required to adjust properties for end-use performance.

The polypropylene materials used in the adhesive composition can be polypropylene random or impact copolymers. For the polypropylene random copolymers, the comonomer can be ethylene or a 1-alkene such as 1-butene, or 1-hexene and should be present in relatively low levels (10 wt % or less). For heat resistance, thermal aging performance, and/or bond retention during and after mechanical, and/or thermal stress, suitable materials for this component possess a higher net crystallinity than the polyolefin elastomers employed in this invention. Suitable polypropylene random copolymers and impact copolymers for this invention are predominantly propylene (greater than 90% by weight propylene), and generally display melt points as measured by DSC (ASTM method E793-01) in the range of about 130° C. to about 165° C., preferably from about 142° C. to about 148° C., and have relatively high melt enthalpy of about 50 Joules/gram to about 100 Joules/gram, preferably from about 60 Joules/gram to about 80 Joules/gram, and most preferably from about 67 Joules/gram to about 74 Joules/gram. The density of the polypropylene random or impact copolymers should be in the range of 0.88 g/cc to 0.92 g/cc when using ASTM D792-00, and preferably about 0.90 g/cc. Polypropylene random copolymers are preferred over the polypropylene impact copolymers because they typically have lower melt points and lower melt enthalpy.

In some embodiments, the polypropylene random copolymers and polypropylene impact copolymers have melt flow rates at 230° C., of at least 0.5 g/10 min to about 1000 g/10 min. Preferred polypropylene random copolymers and impact copolymers have melt flow rates of between 10 and 250 g/10 min using ASTM D-1238 with a temperature of 230° C. and a 2.16 kg weight. More preferred are melt flow rates of between 20 and 200 g/10 minutes. Most preferred melt flow rates are between 30 and 150 g/10 minutes. Materials may be reactor grade or generated via reactive extrusion methods well-known in the art. Examples of polypropylene random copolymers suitable for this invention are Pro-fax® RP591V (which has a melt point of 142° C. and a melt enthalpy of 72 Joules/gram) and Pro-fax® RP488S available from LyondellBasell as well as RP250 and RP350 available from Braskem. Suitable polypropylene impact copolymers useful in this invention are Pro-fax® EP501V (which has a melt point of 160° C. and a melt enthalpy of 91 Joules/gram) and Pro-fax® EP390S available from LyondellBasell as well as 5946WZ and 4944WZ available from TOTAL Petrochemicals.

The polypropylene random copolymer or impact copolymer used is generally present in the adhesive compositions in amounts of about 1 to 30% by weight of the composition, preferably about 2 to 20% by weight are utilized, more preferably about 2.5 to 15% by weight, and most preferably about 8 to 12% by weight. Blends of two or more polypropylene random copolymers and/or impact copolymers may also be used. For example, a blend of a first polypropylene random copolymer and a second polypropylene random copolymer that is different than the first polypropylene random copolymer may also be employed, or a blend of a first polypropylene impact copolymer and a second polypropylene impact copolymer that is different than the first polypropylene impact copolymer may be employed, or a blend of one or more polypropylene random copolymers with one or more polypropylene impact copolymers may be used. From about 0% to about 30% by weight of one or more additional polypropylene random copolymer or impact copolymer may be blended together with the first polypropylene random or impact copolymer if desired.

Polyolefin elastomers suitable for the present invention include low tacticity polypropylene homopolymers with meso diad concentrations less than 90 mol %, melting points below 130° C. (by either Ring & Ball or by DSC), and a molecular weight (Mw) less than about 200,000 g/mol. The most preferred polypropylene homopolymers can be obtained from Idemitsu under the trade name L-MODU. Particularly suitable are L-MODU S400, S600, and, S901 grades. The process to make these polymers is described in detail in U.S. Pat. No. 6,797,774 (assigned to Idemisui Petrochemical Co., Ltd. of Tokyo, JP) along with various hot melt adhesive formulations.

Even though the L-MODU polymers are polypropylene homopolymers, they are very different from traditional polypropylene polymers. Besides having much lower melting points when measured by DSC, their Melt Enthalpy values are also much lower than traditional polypropylene grades. When analyzed according to ASTM E793-01 "Standard Test Method for Enthalpies of Fusion and Crystallization by Differential Scanning calorimetry", the following results are obtained. The test was modified slightly to use a scanning temperature of 20° C. per minute instead of 10° C. per minute.

| L-MODU grade | Glass Transition Temperature (Tg) | Melt Peak | Melt Enthalpy |
|---|---|---|---|
| S-400 | −9.7° C. | 77.6° C. | 4.9 Joules/gram |
| S-600 | −7.8° C. | 77.1° C. | 22.6 Joules/gram |
| S-901 | −8.0° C. | 76.9° C. | 22.6 Joules/gram |

The density of the polymer is also much lower than for a typical polypropylene homopolymer, as shown in the following table.

| Properties | L-MODU S400 | L-MODU S600 | L-MODU S901 |
|---|---|---|---|
| Density (g/cc) | 0.870 | 0.870 | 0.870 |
| Molecular weight (weight average) | 45,000 | 75,000 | 130,000 |
| Molecular weight distribution | 2 | 2 | 2 |
| Softening Point (Ring & Ball) | 93° C. | 100° C. | 120° C. |
| Melt Flow Rate (230° C., 2.16 kg, g/10 min) | 2000 | 350 | 50 |
| Brookfield Melt viscosity at 190° C. (cP) | 8,5000 | 50,000 | 130,000 |

The information in the table above is taken from Idemitsu's web site.

Both the Melt Peak and Melt Enthalpy values are very low compared to most traditional polypropylene based homopolymers. Typical polypropylene homopolymers have melting points of from about 130° C. to 171° C. and melt enthalpy values of about 70 J/g or higher. The L-MODU polymers have a unique combination of properties. In particular, as shown by the above data, the L-MODU polymers are metallocene catalyzed polypropylene homopolymers with low density (0.87 g/cc), low melting point by DSC (75-80° C.), very low melt enthalpy (less than 25 Joules/gram), relatively high Melt Flow Rate (50-2000 g/10 min), and weight average molecular weight (Mw) of from about 45,000 to about 130,000 g/mol). In particular, the low density, low melting point and the low melt enthalpy distinguish these L-MODU polymers from other polypropylene homopolymers.

Other polyolefin elastomers suitable for the present invention can be formed from random poly-α-olefin copolymers and terpolymers derived from ethylene, propylene, 1-butene, 1-hexene, 1-octene and combinations thereof. Polyolefins include ethylene polymers, propylene polymers, and combinations thereof including combinations with other $C_4$-$C_{10}$ alpha-olefins. Elastomeric polyolefins typically contain ethylene and propylene, and may contain other $C_4$-$C_{10}$ olefin monomer units. Some particularly preferred polyolefin polymers are copolymers of propylene with at least one other olefin monomer, such as ethylene-propylene copolymers and ethylene-octene copolymers. The most preferred polymers are propylene/ethylene elastomers, which can be obtained from ExxonMobil Chemical under the trade name designation Vistamaxx®. Suitable commercial grades range from about 9% to about 16% by weight ethylene, a melt Index of from about 1 to about 10 g/10 min, and a density of from about 0.82 to 0.88 grams/cubic centimeter. One particularly preferred grade is Vistamaxx® 6202, which is a polypropylene-co-ethylene) elastomer consisting of about 85% propylene and 15% ethylene and has a Melt Index (190° C./2.16 kg) of 9.1 g/10 minutes and a density of 0.863 g/cc. Olefin block copolymers such as the Infuse® materials sold by Dow that are composed of ethylene and 1-octene are also well suited for this invention.

The olefin elastomer is generally present in the adhesive compositions in amounts of about 2 to 60% by weight, preferably about 5 to 50% by weight are utilized, more preferably about 10 to 40% by weight, and most preferably about 22 to 28% by weight. Blends of two or more olefin elastomers may also be used. For example, a blend of a first olefin elastomer and a second olefin elastomer that is different than the first olefin elastomer may also be employed. From about 0% to about 30% by weight of one or more additional olefin elastomer may be blended together with the first olefin elastomer if desired.

The APAO component of the blend useful in the present invention consists of several different categories of atactic, low molecular weight, low melt viscosity, and substantially amorphous propylene-containing polymers. The term "substantially amorphous" is defined herein as having a degree of crystallinity less than 30%, as determined by differential scanning calorimetry (DSC) against a highly crystalline polypropylene standard. These polymers can be either homopolymers of propylene or copolymers of propylene with one or more α-olefin comonomer, such as, for example, ethylene, butene-1, hexene-1 and octene-1. Poly(1-butene-co-propylene) polymers referred to as "butene rich" APAO polymers are also suitable for the present invention. The average weight molecular weight of the APAO polymers in the scope of the present invention is in the range of from about 4,000 to about 150,000 g/mol, preferably from about 10,000 to about 100,000 g/mol. The said polymers have advantageously a softening point between about 80 and 170° C. and a glass transition temperature from about −5 to −40° C. The amorphous homopolymers and copolymers are polymers produced by Ziegler-Natta catalysts. With Ziegler-Natta catalysts, the produced amorphous polymers have wider molecular weight ranges and composition distributions. The amorphous polymers produced with Ziegler-Natta catalysts are non-stereospecific, e.g., atactic in its morphology. The molecular weight distribution of the amorphous polymer is generally greater than 2 and preferably in the range of 3 to 12.

In one embodiment, the amorphous polymers are poly-α-olefin polymers that have a melt viscosity range greater than about 500 cP to about 50,000 cP and more preferably 500 cP to 20,000 cP at 190° C. (as determined in accordance with ASTM D3236). The amorphous polya alpha olefin polymers are generally present in amounts of about 1% to 40% by weight, preferably about 2% to 20% by weight, more preferably about 2.5% to 20% by weight, and most preferably about 10% to 15% by weight.

Although any APAO polymer falling in the range of physical properties herein described above can be used, preferred APAO polymers are selected from the group consisting of propylene homopolymer, propylene-ethylene copolymer, propylene-1-butene copolymer and terpolymers of propylene, ethylene, and 1-butene. The most preferred amorphous poly-α-olefins are "butene rich" poly(1-butene-co-propylene) copolymer and/or amorphous polypropylene co- and terpolymers of ethylene and/or 1-butene with softening points below 100° C. Exemplary amorphous poly-α-olefin copolymers include the REXtac® 2830 from Rexene and Vestoplast® 508 from Evonik Industries, which have Ring & Ball Softening Points of 90° C. and 84° C. respectively.

A tackifying resin, as defined in the present description can be a molecule or a macro-molecule, generally a chemical compound or a fairly low molecular weight polymer, compared to common polymers, from a natural source or from a chemical process or combination thereof that in general enhances the adhesion of a final hot melt adhesive composition. Representative resins include the $C_5/C_9$ hydrocarbon resins, synthetic polyterpenes, rosin, rosin esters, natural terpenes, and the like. More particularly, the useful tackifying resins include any compatible resins or mixtures thereof such as (1) natural and modified rosins including gum rosin, wood rosin, tall oil rosin, distilled rosin, hydrogenated rosin, dimerized rosin, and polymerized rosin; (2) glycerol and pentaerythritol esters of natural and modified rosins, including the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, such as styrene/terpene and alpha methyl styrene/terpene; (4) polyterpene resins generally resulting from the polymerization of terepene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins resulting from the polymerization of monomers consisting primarily of olefins and diolefins; also included are the hydrogenated aliphatic petroleum hydrocarbon resins; and (7) cyclic petroleum hydrocarbon resins and the hydrogenated derivatives thereof. Mixtures of two or more of the above described tackifying resins may be required for some formulations. Also included are the cyclic or acylic C5 resins and aromatic modified acyclic or cyclic resins.

The tackifying resin should have a Ring and Ball softening point (measured by ASTM E28) of at least about 40° C., most preferably between about 85° C. and 140° C. A preferred tackifier possesses Ring and Ball softening point between about 85° C. to 140° C. and can be obtained from ExxonMobil Chemical under the tradename of Escorez 5400, 5600, and 5615. Also, other preferred tackifying resins are partially hydrogenated aliphatic hydrocarbon resins such as Eastotac® H100L and Eastotac® H100R, as well as non-hydrogenated aliphatic C5 resins and aromatic modified C5 resins with low aromaticity such as Piccotac® 1095 and Piccotac® 9095, respectively.

The tackifiers are generally present in the adhesive compositions in an amount greater than the amount of the polypropylene copolymer or the polypropylene impact copolymer. Within this range, amounts of about 5 to 70% by weight of the composition, preferably about 10 to 60% by weight are utilized, more preferably about 20% to 55% by weight, and most preferably about 21% to 27% by weight. Blends of two or more tackifying resins may also be used. For example, a blend of a first tackifying resin and a second tackifying resin that is different than the first tackifying resin may also be employed. From about 5% to about 70% by weight of one or more additional tackifying resins may be blended together with the first tackifying resin if desired.

The plasticizer component useful in the present invention may be selected from any of the mineral based oils, petroleum based oils, liquid resins, liquid elastomers, polybutene, polyisobutylene, phthalate and benzoate plasticizers, and epoxidized soya oil. A plasticizer is broadly defined as a typically organic composition that can be added to the thermoplastic rubbers and other resins to improve extrudability, flexibility, workability and stretchability in the finished sealant. Any material which flows at ambient or application temperatures and is compatible in the compositions of the present invention may be useful. Preferably, the plasticizer has low volatility at temperatures of greater than about 40° C. The most commonly used plasticizers are oils which are primarily hydrocarbon oils, low in aromatic content and are paraffinic or naphthenic in character. The oils are preferably low in volatility, transparent and have as little color and odor as possible. This invention also may include olefin oligomers, low molecular weight polymers, vegetable oils and their derivatives and similar plasticizing oils. Solid plasticizers may also be useful to the present invention. Examples of such plasticizers include 1,4-cyclohexane dimethanol dibenzoate, glyceryl tribenzoate, pentaerythritol tetrabenzoate, and dicylcohexylphthalate. Preference is given to the petroleum based oils with suitable naphthenic minerals oils useful in this invention of the types herein described above are commercially available from Nynas, under the trade name Nyflex 222B®. Suitable liquid plasticizers include polybutene such as Indopol series materials supplied by Ineos. As required, blends of plasticizers can also be employed to adjust end use performance and final properties.

0% to about 60%, preferably about 1% to about 60%, more preferably about 5% to about 50%, even more preferably about 20% to about 50%, and most preferably about 24% to about 29%, by weight, of a plasticizer may be used in the composition. Blends of two or more plasticizers may also be used. For example, a blend of a first plasticizer and a second plasticizer that is different than the first plasticizer may also be employed. From about 1% to about 60% by weight of one or more additional plasticizers may be blended together with the first plasticizers if desired.

The present invention may include a stabilizer in an amount of from about 0% to about 5% by weight. Preferably from about 0.1% to 5% of a stabilizer is incorporated into the composition. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the indicator as well as in the ordinary exposure of the final product to the ambient environment. Among the applicable stabilizers are high molecular weight hindered phenols and multifunction phenols, such as sulfur and phosphorous-containing phenols. Hindered phenols are well known to those skilled in the art and may be characterized as phenolic compounds that also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5-trimethyl-2,4,6-tris(3-5-di-tert-butyl-4-hydroxybenzyl) benzene;

pentaerythritol tetrakis-3 (3,5-di-tert-butyl-4-hydroxyphenyl)propionate;

n-octadecyl-3(3,5-di-tert-butyl-4-hydroxyphenyl) propionate;

4,4'-methylenebis(4-methyl-6-tertbutylphenol);

2,6-di-tert-butylphenol;

6-(4-hydroxyphenoxy)-2,4-bis(n-octylthio 1,3,5-triazine;

2,3,6-tris(4-hydroxy-3,5-di-tert-butyl-phenoxly,3,5-triazine di-n-octadecyl-3,5-di-tert-butyl-4-ydroxybenzylphosphonate;

2-(n-octylthio)ethyl-3,5-di-tert-butyl-4-hydroxybenzoataen; and sorbitol hexa-3(3,5-di-tet-butyl-4-hydroxy-phenyl)propionate.

Especially preferred as a stabilizer is pentaerythritol tetrakis-3(3,5-ditert-butyl-4-hydroxyphenol) propionate.

The performance of these stabilizers may be further enhanced by utilizing, in conjunction therewith; (1) synergists such as, for example, thiodipropionate esters and phosphites; and (2) chelating agents and metal deactivators such as, for example, ethylenediamenetetraacetic acid, salts thereof, and disalicylalpropylenediimine.

It should be understood that other optional additives may be incorporated into the adhesive composition of the present invention in order to modify particular physical properties. These may include, for example, such materials as ultraviolet light (UV) absorbers, surfactants, inert colorants, e.g., titanium dioxide, fluorescing agents and fillers. Typical fillers include talc, calcium carbonate, clay silica, mica, wollastonite, feldspar, aluminum silicate, alumina, hydrated alumina, glass microspheres, ceramic microspheres, thermoplastic microspheres, baryte and wood flour.

The hot melt adhesive composition of the present invention may be formulated using any of the techniques known in the art. A representative example of the mixing procedure involves placing all the components, except the copolymer, in a jacketed mixing vessel equipped with a rotor, and thereafter raising the temperature of the mixture to a range from 135 to 200° C. to melt the contents. It should be understood that the precise temperature to be used in this step would depend on the melting points of the particular ingredients. The copolymer is subsequently introduced to the vessel under agitation and the mixing is allowed to continue until a consistent and uniform mixture is formed. The contents of the vessel may be protected with inert gas such as carbon dioxide and/or nitrogen during the entire mixing process.

The resulting hot melt adhesive may then be applied to substrates using a variety of coating techniques. Examples include hot melt slot die coating, hot melt wheel coating, hot melt roller coating, melt-blown coating and spiral spray coating.

The adhesive composition of the present invention may be used in a number of applications such as, for example, in disposable nonwoven hygienic articles, paper converting, flexible packaging, wood working, carton and case sealing, labeling and other assembly applications. Particularly preferred applications include disposable diaper and feminine sanitary napkin construction, diaper and adult incontinent brief elastic attachment, diaper and napkin core stabilization, diaper backsheet lamination, industrial filter material conversion, surgical gown and surgical drape assembly.

Tests and Materials

Brookfield viscosity was tested according to ASTM D-3236 Method at the appropriate temperature.

Ring & Ball softening point was determined with an automated Herzog unit according to ASTM E-28 method.

Dynamic Temperature Testing (ASTM D4440-01)

The rheology of a given hot melt adhesive can be determined using a TA Instruments rheometer, such as an Ares 3 model. For the adhesives listed in the tables below, a temperature step procedure was used to determine the storage modulus, G', at various temperatures as well as the glass transition temperature, Tg. The instrument was set to a frequency of 10 radians per second, the sample melted at 170° C. and the temperature was varied from slowly reduced to −40° C. The parallel plates used had a 25 mm diameter and a 1.6 millimeter gap.

Application Testing

To test the bonding performance of the adhesives in hygiene applications, bilaminate nonwoven/breathable film structures were prepared using an Acumeter LH-1 lab-scale coater. The nonwoven used for bonding studies was a hydrophobic, spunbond/meltblown/spunbond (SMS) grade available from First Quality with a 15 gsm target basis weight. The breathable film employed was an embossed PE grade with a 19 gsm target basis weight produced by Clopay BR 134. For LH-1 testing, commercial rolls of substrate were split to 2 inch wide rolls. Adhesives were applied at 10-90° C. above the melt point based on their viscosity and coated using a slot nozzle with a 7 mm wide gap. Add-on was targeted at 10 gsm which was confirmed by mass balance studies. Adhesives were applied to the nonwoven substrate, merged with the PE film, and the structure was compressed using a nip roller. At the 300 ft/min line rate, the open time was calculated to be approximately 0.25 seconds. Maximum nip compression was employed to probe the set-up and resistance of the adhesive to blocking. A subjective scale was also used to gauge blocking: a "0" rating was assigned to bilaminates that showed no detectable resistance to unspooling while "5" ratings were given to those that showed interlayer destruct of the bilaminate rolls upon unwinding. Laminate bond tensile strengths were tested in machine direction immediately off-line ("green"), after one-day ("initial") and after aging for 6 hours at 60° C. using an Instron with a crosshead speed of 305 mm/min.

Tests for Pre-Set Cold Flow and Blocking Resistance:

Tests were developed to gauge the "pre-set cold flow" of the experimental adhesives. "Pre-set cold flow" here describes the tendency of some formulations to continue to flow for a fixed time even after the material has been cooled and solidified. This behavior has been observed in polyolefin formulations; particularly, those based on only low modulus materials. While potentially beneficial to wet out and bonding, it is believed that adhesives displaying extreme initial cold flow after application can continue to penetrate porous materials eventually contributing to roll blocking. It is important that this behavior eventually stops over time as the bond fully develops; therefore, this behavior is not readily identified using standard cold flow or rheological tests known in the art. Quantitative and qualitative methods were both used to probe the effect of formulation components on pre-set cold flow. For the quantitative test, a pre-weighed, 30 mL plastic polypropylene beaker with a circular ¼ inch opening in the bottom was clamped to a ring stand and raised approximately one foot from the lab bench. A silicone plate was raised with a lab jack until it was in tight contact with the bottom of the beaker to fully seal the opening. The beaker was next filled completely with molten adhesive at 177° C. After standing at room temperature for 20 min, the silicone plate was removed. After 30 min, any material that had flowed from the flask was collected and weighed along with the remaining material in the beaker. The amount that had flowed relative to the total amount used was employed to gage the "pre-set" cold flow of the inventive and comparative examples below. Pre-set cold flow was also gauged using a qualitative ball test. To allow for more rapid cooling, approximately 50 g of molten adhesive was poured as a thin sheet onto release paper. After cooling at room temperature for a total for five minutes, the adhesive was shaped manually into a sphere. Once the sphere was no longer readily deformed, it was placed on the bench top and allowed to stand for four hours. The sample was visually inspected for dimensional stability and the amount of "flattening" of the bottom surface was rated as 0 to 5 (a "0" represents no flattening; a "5" describes samples with extensive flow leading to flattening and a near pancake shape before finally achieving dimensional stability).

EXAMPLES

Raw Materials

Nyflex 222B is a hydrotreated napthenic process oil available from Nynas Corporation.

Escorez 5400 is a hydrogenated cycloaliphatic hydrocarbon resin with a 103° C. softening point. It is available from ExxonMobil Chemical.

Escorez 5615 is a hydrogenated aromatic modified cycloaliphatic hydrocarbon resin with a 115° C. softening point. It is available from ExxonMobil Chemical.

Vestoplast 508 is a butene rich poly(l-butene-co-propylene) copolymer available from Evonik Industries. It has a Brookfield viscosity of 8,000 cP at 190° C. and a Ring & Ball softening point of 84° C.

Pro-fax RP591V is a random propylene copolymer available from Lyondellbasell Polymers. RP591V has a Melt Flow Rate (230° C./2.16 kg) of 100 g/10 min and a density of 0.90 g/cc.

L-MODU 5600 is a low modulus, controlled tacticity polypropylene available from Idemitsu. It is reported to have a Brookfield viscosity of 52,000 cP (190° C.) and a density of 0.87 g/cc.

L-MODU 5901 is a low modulus, controlled tacticity polypropylene available from Idemitsu. It is reported to have a MFR of 50 g/10 min (230° C./2.16 kg) and a density of 0.87 g/cc.

104N wax is a polyethylene wax with a Ring & Ball softening point of 118° C. and a density of 0.93 g/cc. It is available from Hana Corporation.

Irganox 1010 antioxidant is pentaerythritol tetrakis(3-(3,5-di-tert-butyl-4-hydroxyphenyl)propionate) available from BASF Corp.

Irgafos 168 stabilizer is a tris(2,4-di-tert-butylphenyl) phosphate available from BASF Chemicals.

Procedure:

All formulations were produced on a 300 g scale, using the following method. A 475 mL steel vessel was charged with mineral oil, antioxidants and other polymer additives, tackifying resin and the APAO. Wax, if present, is also added at this point. A digitally-controlled heating mantle equipped with an internal thermocouple was used to gradually heat the formulation to the target temperature (177 to 190° C.). After the mixture appeared mostly homogenous, the solution was mechanically stirred between 100 to 200 rpm, and the low modulus polyolefin was gradually added followed by the polypropylene random copolymer. The resultant clear to slightly hazy molten mixture was held at the target temperature an additional 30 to 120 minutes until it appeared to be fully homogenized. After this time, the vessel was removed from the heating mantle and samples were collected for testing.

Example 1 (Ex 1) and Comparative Examples 1-3 (CE1, CE2, and CE3)

The formulations in Table 1 were produced as described above and screened for pre-set cold flow resistance. The first comparative example, (CE1 in Table 1) produced using only a combination of L-MODU and an APAO leads to materials that display significant pre-set cold flow even after cooling. Such materials are expected to lead to blocking in applications employing porous substrates.

Example 1 (Ex 1) shows that replacement of a portion of the L-MODU of CE 1 with a propylene copolymer leads to an adhesive that exhibits zero pre-set cold flow by the quantitative test method. Despite this, the qualitative ball test suggests that with rapid cooling, limited flow is nevertheless seen. This type of low, but non-zero flow is proposed to provide the wet out needed for strong bonding without extensive penetration of the substrate that can lead to blocking and/or bleed through.

Comparative example 2, CE2, replaces the Escorez 5400 with a much higher Ring & Ball softening point tackifier, Escorez 5615. The behavior of CE2 is similar to CE1 suggesting that employing matrix components that are expected to solidify more rapidly do not benefit cold flow.

Comparative example 3, CE3, includes a higher molecular weight L-MODU 5901 grade in a mixture analogous to CE1. Here the pre-set cold flow using the quantitative method is far lower than CE1. This is not unexpected based on the substantially higher viscosity of CE3. Despite this, CE3 shows significant flow with rapid cooling as gauged by the qualitative ball test. From this, it does not appear as if simply employing higher molecular weight, low flow base polymers will solve completely issues stemming from pre-set cold flow in adhesive formulations lacking a more crystalline propylene polymer, copolymer, or impact copolymer.

Bilaminate data from samples prepared as described on the lab coater for Ex 1 and CE1 suggest these cold flow tests to provide some insight into the performance of the adhesives under real-world coating conditions. As shown in the table, Example 1 provides suitable strong initial and aged performance in bonding hygiene-industry relevant substrates (gauged here by values over 125 g) without displaying over-penetration or blocking. While laminates made using the CE1 formulation exhibit high initial and aged bonding performance, their extreme blocking makes them unsuitable for use with porous substrates particularly low basis weight nonwovens. It is important to note here that the high bond strengths seen using a materials that exhibit pre-set cold flow such as CE1 are likely bolstered by the over penetration that leads to blocking seen in the screening.

TABLE 1

Example 1 and Comparative Examples 1-3

|  | Ex 1 | CE1 | CE2 | CE3 |
|---|---|---|---|---|
| Raw Material |  |  |  |  |
| Nyflex 222B, wt % | 26.62 | 26.62 | 26.62 | 23.52 |
| Escorez 5400, wt % | 24.35 | 24.35 | — | 21.51 |
| Escorez 5615, wt % | — | — | 24.35 | — |
| Vestoplast 508, wt % | 13.18 | 13.18 | 13.18 | 11.57 |
| L-MODU S600, wt % | 25.05 | 35.05 | 35.05 | 21.30 |
| L-MODU S901, wt % | — | — | — | 21.30 |
| Prof-fax RP591V, wt % | 10.00 | 0.00 | 0.00 | 0.00 |
| Irganox 1010, wt % | 0.27 | 0.27 | 0.27 | 0.27 |
| Irgafox 168, wt % | 0.53 | 0.53 | 0.53 | 0.53 |
| TOTAL | 100.00 | 100.00 | 100.00 | 100.00 |
| Test Data |  |  |  |  |
| Viscosity, cP (163° C.) | 8,550 | 6,100 | 13,770 | 55,400 |
| RBSP, ° C. (glycerin) | 131 | 77 | 79 | 86 |
| Quantitative Pre-set Cold Flow, % | 0.0 | 10.0 | 19.0 | 1.4 |
| Ball Test Flow | 1.5 | 5.0 | 4.5 | 4.5 |
| LH-1 Blocking Rating | 0.0 | 2.5 | — | — |
| Green Peel, grams | 310 | 280 | — | — |
| 60° C., 6 hour Aged Peel, grams | 340 | 170 | — | — |

Numerous formulations were screened as described above to demonstrate the utility of the inventive adhesives. These formulations along with comparative examples and screening results are provided in the Tables 2 and 3 below (in addition to components listed, all formulations contain 0.27 wt % Irganox 1010 and 0.53 wt % Irgafox 168).

TABLE 2

Examples 2-6 and Comparative Examples 4-10

| Example | Nyflex 222B, wt % | Escorez 5400, wt % | Vestoplast 508, wt % | L-MODU S600, wt % | Pro-fax RP591V, wt % | 104N Wax, wt % |
|---|---|---|---|---|---|---|
| Ex 2 | 26.6 | 24.4 | 13.2 | 25.0 | 10.0 | 0.0 |
| Ex 3 | 26.1 | 20.2 | 8.1 | 30.4 | 10.2 | 4.0 |
| Ex 4 | 10.0 | 35.0 | 20.0 | 20.0 | 15.0 | 0.0 |
| Ex 5 | 19.2 | 35.0 | 20.0 | 10.0 | 15.0 | 0.0 |
| Ex 6 | 10.0 | 65.0 | 4.6 | 4.6 | 15.0 | 0.0 |
| CE4 | 26.6 | 24.4 | 13.2 | 35.1 | 0.0 | 0.0 |
| CE5 | 10 | 48.5 | 23.6 | 17 | 0.1 | 0.0 |
| CE6 | 31.1 | 10 | 17.3 | 40 | 0.8 | 0.0 |
| CE7 | 17.9 | 35 | 4.4 | 40 | 0.0 | 1.9 |
| CE8 | 35 | 19.6 | 20 | 21 | 0.0 | 3.6 |
| CE9 | 35 | 19.6 | 20 | 21 | 0.0 | 3.6 |
| CE10 | 35 | 29.7 | 0 | 29.5 | 0.0 | 5.0 |

Examples 2-6 highlight the ability of the inventive adhesives to form strong initial and aged bond without exhibiting blocking Comparative examples 4-6 help to define the range of the inventive formulation space as using extremely low levels (less than 1 wt %) or omitting completely the isotactic polypropylene Pro-fax 591V leads to increased blocking in laminate applications. Comparative examples 7-10, that employ only a high melting wax as the crystalline component, display extremely high blocking in coating studies. These comparative examples support further the unique ability of the inventive formulations to resist blocking when coating to porous substrates such as nonwovens.

TABLE 3

Examples 2-6 and Comparative Examples 4-10

| Example | R&B Soft. Ft. | Viscosity 163° C. | Blocking | Green Peel, g | 6 h, 60° C. Peel |
|---|---|---|---|---|---|
| 2 | 131 | 8,550 | 0 | 340 | 170 |
| 3 | 131 | 12,200 | 0 | 180 | 140 |
| 4 | 134 | 25,960 | 1 | 340 | 190 |
| 5 | 132 | 12,500 | 1 | 620 | 160 |
| 6 | 130 | 9,050 | 0 | 190 | 130 |
| CE4 | 77 | 6,116 | 2.5 | 310 | 280 |
| CE5 | 72 | 5,485 | 2 | 305 | 280 |
| CE6 | 90 | 9,480 | 3 | 160 | 100 |
| CE7 | 97 | 9,355 | 3 | 600 | 300 |
| CE8 | 101 | 2,050 | 4 | 600 | 380 |
| CE9 | 101 | 2,110 | 4 | 600 | 380 |
| CE10 | 102 | 1,950 | 5 | 420 | 300 |

What is claimed is:

1. A hot melt adhesive, comprising:
   (a) about 1% to about 30% by weight of a polypropylene random copolymer having a melting point between about 130° C. to about 165° C. and a melt enthalpy of between about 50 Joules/gram and about 100 Joules/gram;
   (b) 22% to about 60% by weight of a polyolefin elastomer comprising a polypropylene homopolymer and having a melting point of less than about 130° C.;
   (c) about 1% to about 40% by weight of an amorphous polyalphaolefin produced by a Ziegler-Natta catalyst;
   (d) about 5% to about 70% by weight of a tackifying resin;
   (e) 0% to about 60% by weight of a plasticizer;
   (f) 0% to about 5% of a stabilizer or antioxidant;
   wherein the viscosity of the composition is equal to or less than about 40,000 cP at 163° C. and the polypropylene random copolymer has a higher net crystallinity than the polyolefin elastomer.

2. The hot melt adhesive of claim 1 wherein the viscosity of the composition is equal to or less than 20,000 cP at 163° C.

3. The hot melt adhesive of claim 1 wherein the viscosity of the composition is equal to or less than 10,000 cP at 163° C.

4. The hot melt adhesive of claim 1 comprising about 2% to about 20% by weight of the polypropylene random copolymer.

5. The hot melt adhesive of claim 1 comprising 22% to about 50% by weight of the polyolefin elastomer.

6. The hot melt adhesive of claim 1 comprising 22% to about 40% by weight of the polyolefin elastomer.

7. The hot melt adhesive of claim 1 comprising about 2% to about 20% by weight of the amorphous polyalphaolefin.

8. The hot melt adhesive of claim 1 comprising about 10% to about 60% by weight of the tackifying resin.

9. The hot melt adhesive of claim 1 comprising about 20% to about 55% by weight of the tackifying resin.

10. The hot melt adhesive of claim 1 comprising about 1% to about 60% by weight of the plasticizer.

11. The hot melt adhesive of claim 1 comprising about 5% to about 50% by weight of the plasticizer.

12. The hot melt adhesive of claim 1 wherein said polypropylene random copolymer has a melt flow rate of about 0.5 grams/10 min to about 1000 grams/10 min.

13. The hot melt adhesive of claim 12 wherein said polyolefin elastomer comprises a metallocene catalyzed polypropylene homopolymer having a density of about 0.87 g/cc.

14. The hot melt adhesive of claim 1 wherein said amorphous polyalphaolefin comprises a copolymer of propylene with one or more alpha-olefin comonomer.

15. The hot melt adhesive of claim 14 wherein said alpha-olefin comonomer is ethylene, butene-1, hexene-1 or octene-1.

16. The hot melt adhesive of claim 1 further comprising an additional additive selected from the group consisting of ultraviolet light absorbers, surfactants, inert colorants, fluorescing agents, fillers, and mixtures thereof.

17. The hot melt adhesive of claim 1, wherein the melting point of the polypropylene random copolymer is between about 142° C. to about 148° C.

18. The hot melt adhesive of claim 1 comprising from about 25% to about 60% by weight of the polyolefin elastomer.

19. The hot melt adhesive of claim 1, wherein the polyolefin elastomer has a weight average molecular weight in the range of from about 75,000 g/mol to about 130,000 g/mol.

20. The hot melt adhesive of claim 1, wherein the polyolefin elastomer has a Ring & Ball softening point of between about 100° C. to about 120° C.

21. The hot melt adhesive of claim 1, wherein the polyolefin elastomer has a melt flow rate of about 50 grams/10 min to about 350 grams/10 min.

22. The hot melt adhesive of claim 1, wherein the polyolefin elastomer has a viscosity of between about 50,000 cP to about 130,000 cP at 190° C.

23. The hot melt adhesive of claim 1, wherein the polyolefin elastomer has a melt enthalpy of less than about 25 Joules/gram.

24. The hot melt adhesive of claim 1, wherein the polyolefin elastomer has a melting point of less than about 80° C.

25. The hot melt adhesive of claim 1, wherein said amorphous polyalphaolefin comprises a copolymer of propylene and butene-1.

26. A hot melt adhesive, comprising:
   (a) about 8% to about 12% by weight of a polypropylene random copolymer having a melting point between about 130° C. to about 165° C. and a melt enthalpy of between about 50 Joules/gram and about 100 Joules/gram;
   (b) 22% to about 28% by weight of a metallocene catalyzed polypropylene homopolymer elastomer having a density of about 0.87 g/cc and a melting point of less than about 130° C.;
   (c) about 10% to about 15% by weight of an amorphous polyalphaolefin produced by a Ziegler-Natta catalyst;
   (d) about 21% to about 27% by weight of a hydrocarbon tackifying resin;
   (e) about 24% to about 29% by weight of a mineral oil plasticizer;
   (f) 0% to about 5% of a stabilizer or antioxidant;
   wherein the viscosity of the composition is equal to or less than about 10,000 cP at 163° C. and the polypropylene random copolymer has a higher net crystallinity than the polyolefin elastomer.

27. The hot melt adhesive of claim 26 wherein said polypropylene random copolymer has a melt flow rate of about 0.5 grams/10 min to about 1000 grams/10 min.

28. The hot melt adhesive of claim 26 wherein said amorphous polyalphaolefin comprises a copolymer of propylene with one or more alpha-olefin comonomer, said alpha-olefin comonomer comprising ethylene, butene-1, hexene-1 or octene-1.

29. The hot melt adhesive of claim 26 further comprising an additional additive selected from the group consisting of ultraviolet light absorbers, surfactants, inert colorants, fluorescing agents, fillers, and mixtures thereof.

30. The hot melt adhesive of claim 26, wherein the melting point of the polypropylene random copolymer is between about 142° C. to about 148° C.

31. The hot melt adhesive of claim 26, wherein said amorphous polyalphaolefin comprises a copolymer of propylene and butene-1.

* * * * *